United States Patent Office 2,879,297
Patented Mar. 24, 1959

2,879,297
PREPARATION OF DIARYL KETONES

Erhard J. Prill and Milton Kosmin, Dayton, Ohio, assignors to Monsanto Chemical Company, St. Louis, Mo., a corporation of Delaware No Drawing. Application August 4, 1955
Serial No. 526,545

9 Claims. (Cl. 260—591)

This invention relates to a new method of synthesis of ketones.

It has been known hitherto to prepare ketones by the reaction of acyl halides or carboxylic anhydrides with aromatic hydrocarbons or substituted aromatic hydrocarbons in the presence of acylation catalysts such as halogen-containing Friedel-Crafts catalysts, e.g., aluminum chloride. The acyl halides and carboxylic anhydrides, however, usually must be prepared from the corresponding acids in a separate step before they are contacted with the catalyst and aromatic hydrocarbon or substituted hydrocarbon to produce the desired ketone.

It has now been found that ketones may be prepared expeditiously and directly from the corresponding acids, by the simultaneous reaction of an aromatic carboxylic acid, and aryltrichloromethane, and an aromatic compound capable of acylation, in the presence of acylation catalysts. This reaction may be represented schematically as follows:

$$\text{ArCOOH} + \text{ArCCl}_3 + 2\text{ArH} \rightarrow 2\text{Ar.CO.Ar} + 3\text{HCl}$$

where Ar is an aromatic radical.

The carboxylic acids useful in the present reaction comprise benzoic and the naphthoic acids together with their substitution products containing alkyl, aryl, halogen, hydroxy, alkoxy, carbalkoxy, or nitro groups. Particularly useful in the present process and readily available are the aromatic hydrocarbon carboxylic acids, such as the isomeric toluic acids, p-ethylbenzoic acid, the dimethylbenzoic acids, the methylnaphthoic acids, 4-biphenylcarboxylic acid, etc., and the haloaromatic carboxylic acids, e.g., o-, m-, and p-chlorobenzoic acid, the dichlorobenzoic acids, the tri- and tetrachlorobenzoic acids, the chloronaphthoic acids, the chlorotoluic acids, 4-chloro-2,6-dimethylbenzoic acid, 3-bromo-2,5-dimethylbenzoic acid, etc. Other aromatic acids which undergo the reaction of the invention include hydroxyaromatic acids such as 4-hydroxy-1-naphthoic acid, 3,5-dichlorosalicylic acid, 2,3-cresotic acid, etc.; alkoxyaromatic acids such as anisic acid, the methyl ether of salicyclic acid, 3-methoxy-2-naphthoic acid, etc.; carbalkoxyaromatic acids such as o-carbethoxybenzoic acid, and 5-carbomethoxy-1-naphthoic acid; and nitro-substituted acids such as o-, m-, and p-nitrobenzoic acid, 4-nitro-o-toluic acid, 5-nitro-1-naphthoic acid, etc.

As the aryltrichloromethane of the formula given in the equation above and useful in the present process, there may be used trichloromethyl-substituted aromatic compounds in which the aromatic nucleus is otherwise unsubstituted, such as benzotrichloride and β-trichloromethylnaphthalene, or there may be employed ar-substituted aryltrichloromethanes which carry in addition to the trichloromethyl group any non-interfering substituent, as listed above for the possible aromatic acid components of the present reaction. Thus, for example, alkaryltrichloromethanes available for use in the process of the invention include α,α,α-trichloro-p-xylene, 1-trichloromethyl - 5 - butylnaphthalene, p-dodecylbenzotrichloride, etc. Other substituted trichlorides which may be employed in the new ketone synthesis disclosed by the present invention include those containing halogen substituents, such as p-chlorobenzotrichloride, those containing alkoxy substituents, such as 1-trichloromethyl-5-methoxynaphthalene; those containing carbalkoxy substituents, such as p-carbethoxybenzotrichloride; carbalkoxyoxy compounds, such as p-carbethoxyoxybenzotrichloride; and nitro-substituted aryltrichloromethanes, such as m-nitrobenzotrichloride. In addition, there may also be employed, if desired, poly(trichloromethyl) compounds, such as α,α,α,α',α'α-hexachloro-p-xylene. The substituents on the trichloromethyl reactant, furthermore, may be the same as, or different, from those on the aromatic acid employed in the process.

The third constituent of the present reaction may be any aromatic compound capable of acylation. Generally, benzene and the polynuclear hydrocarbons, i.e., biphenyl, naphthalene, phenanthrene, etc., are readily acylated. Electronegative groups, such as halogen, nitro, keto, etc., have an inhibiting effect on ease of acylation, whereas substituent groups which have an activating effect on the aromatic nucleus include alkyl, hydroxy, and alkoxy substituents. The effect of activating substituents may counteract and indeed reverse the effect of negative substituents, so that, for example, whereas nitrobenzene is recalcitrant to acylation as compared to benzene, an alkylnitrobenzene such as a nitroxylene may display enhanced activity over the unsubstituted hydrocarbon. Furthermore, the inhibiting influence of negative groups on polynuclear hydrocarbons extends only to the reactivity of the individual ring of the molecule on which they are substituted, so that, for example, in α-nitronaphthalene, the reactivity of only one of the two rings present in the molecule is inhibited, whereas the other fused ring of the system may be acylated without difficulty. The rules governing the activating and/or deactivating effects of substituents on readiness of acylation are well understood in the chemical art, and are discussed, for example, in the chapter on ketone synthesis in "Anhydrous Aluminum Chloride in Organic Chemistry," by C. A. Thomas (N.Y., Reinhold, 1941, p. 204 ff.).

Preferred in the present process are aromatic hydrocarbons, i.e., the fundamental aromatic ring systems, and their alkylation and partial hydrogenation products. Unsubstituted aromatic hydrocarbons which may be acylated by the process of this invention include, e.g., benzene, polynuclear fully aromatic hydrocarbons such as anthracene, naphthalene, biphenyl, phenanthrene, pyrene, chrysene, etc., and partially hydrogenated aromatic hydrocarbons such as hydrindene, tetralin, and acenaphthene. Particularly susceptible to acylation by the present process, because of activation by the substituent groups, are alkylated aromatic hydrocarbons, such as the methylbenzenes, i.e., toluene, the xylenes, the trimethylbenzenes, i.e., mesitylene, pseudocumene, and hemimellitene, the tetramethylbenzenes, i.e., prehnitene, isodurene and durene, as well as higher alkylbenzenes, e.g., ethylbenzene, the diethylbenzenes, cumene, n-propylbenzene, p-cymene, n-butylbenzene, t-butylbenzene, dodecylbenzene, etc.; substituted biphenyls, i.e., 4-benzylbiphenyl, 2-ethylbiphenyl, etc.; and alkylated fused nuclear systems, e.g., α-methylnaphthalene, β-ethylnaphthalene, retene, etc.

Also readily susceptible to acylation and included in the scope of the present process are the ethers of hydroxyaromatic compounds. Generally, the parent hydroxy compounds, i.e., phenols and naphthols, etc., from which such ethers may be derived are reactive, but are subject to esterification rather than acylation under the reaction conditions; however, with the oxy group protected by substitution of an alkyl group for the hydrogen atom of the hydroxyl radical, acylation occurs readily. Examples of ethers which may be acylated by the present process include anisole, phenetole, phenyl propyl ether, methyl o-tolyl ether, methyl 2,4-xylyl ether, veratrole, resorcinol dimethyl ether, hydroquinone dimethyl ether, α-naphthyl methyl ether, diphenyl ether, 4-methoxybiphenyl, etc. The analogous thiophenol ethers, e.g., ethyl phenyl sulfide, methyl p-tolyl sulfide, methyl 1-naphthyl sulfide, 3-methoxyphenyl propyl sulfide, etc., similarly may be acylated by the present process. Heterocyclic sulfur compounds, such as thiophene, methylthiophene, etc., also are capable of acylation in accordance with the present method.

In addition to the above aromatic hydrocarbons and aromatic compounds containing activating groups, it is also possible by the present process to prepare aryl ketones from compounds containing electronegative substituents such as halogen, carbalkoxy, etc. Chlorobenzene, chlorotoluene, o-chlorotoluene, α-chloronaphthalene, 4,10-dichloroperylene, o-chloroanisole, etc., are all capable of acylation by the present process. While the carbalkoxy and hydrocarboncarbonyl (acyl) groups are generally inhibiting to acylation, it is possible to use the process of the present invention to acylate compounds containing these groups either when they are activated by the presence of other substituents, such as salicylate esters (hydroxyl group activating), e.g., methyl, ethyl or phenyl salicylate, or when the compound is a polynuclear material which contains a ring free of inhibiting groups, such as benzoylnaphthalene, acetylnaphthalene, ethyl 1-naphthoate, benzoylperylene, chlorobenzoylretene, etc. Compounds containing the nitro group similarly require the presence of an activating group or an unsubstituted ring to be capable of acylation. Among compounds capable of acylation by the present process and containing the nitro group may be listed, for example, o-nitroanisole, p-nitrophenyl phenyl ether, etc. Another class of nitrogen-containing compounds capable of acylation are amino compounds in which the nitrogen atom has been protected from amidation by substitution. Thus, for example, when the amino group is protected by previous amidation, there may be prepared by the present process aroylated aryl amides, by acylation of, for example, acetanilide, α-acetamidonaphthalene, m-chloroacetanilide, aceto-p-toluidide, etc.

Catalysts for the reaction of aromatic carboxylic acids, aryltrichloromethanes, and aromatic compounds capable of acylation to produce aryl ketones in accordance with the present process may be any Friedel-Crafts acylation catalyst. The Friedel-Crafts type catalysts are a well-known group of halides, which may be exemplified, for example, by metallic halides such as aluminum chloride, ferric chloride, zinc chloride, stannic chloride, titanium tetrachloride, aluminum fluoride, calcium fluoride, mercuric fluoride, mixed halides such as aluminum dichlorofluoride, non-metallic catalysts such as boron trifluoride and hydrogen fluoride, etc. Other Friedel-Crafts type catalysts are well-known in the chemical art. We have found, furthermore, that Friedel-Crafts catalytic metallic halides may be replaced in the present process, if desired, by polyvalent non-alkaline earth metals, e.g., zinc dust, or oxy compounds thereof, such as the salts of such metals with carboxylic acids, e.g., tin benzoate, zinc carbonate, etc., or inorganic oxy compounds of these metals, such as the oxide, hydroxide or oxyhydrate, e.g., zinc oxide. Combinations of the above catalytic agents may also be used, if desired.

As is well known in the chemical art, aluminum chloride forms a complex oxonium salt with carbonyl-oxygen-containing compounds, such as the ketones which are the products of the process of the present invention; if aluminum chloride is used as the catalyst in the present invention, it is necessary to use the metallic halide in stoichiometric amounts. Aluminum chloride also suffers from the disadvantages that it must be used under anhydrous conditions in the reaction process, and that the reaction mixture must be carefully decomposed with water at the close of the reaction to separate the product from the aluminum salt. It is therefore preferred in the present reaction to utilize one of the other catalysts mentioned above, such as ferric chloride, zinc chloride, etc., which have been found to be effective in catalytic amounts, although the use of aluminum chloride is not excluded.

The products of the present reaction are aryl ketones. As will be readily evident to those skilled in the art, generally a mixture of products will be obtained, the compounds formed including isomeric forms of the ketone products, depending on the position at which acylation of the aromatic hydrocarbon or aromatic compound capable of acylation takes place. If the aromatic radicals of the aromatic carboxylic acid and the aryltrichloromethane are different, mixtures of products will result, including ketones in which the aromatic radical of the carboxylic acid is adjoined through a carbonyl radical to the aromatic compound capable of acylation used in the reaction mixture, and ketones in which the aromatic radical of the aryltrichloromethane has been attached through a carbonyl group to the aromatic compound which has been entered into the reaction. Thus, for example, the process of the present invention in such a case may be represented by the equation:

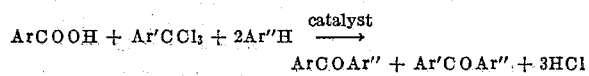

$$ArCOOH + Ar'CCl_3 + 2Ar''H \xrightarrow{catalyst} ArCOAr'' + Ar'COAr'' + 3HCl$$

where Ar, Ar' and Ar'' are aromatic radicals.

When the aromatic radicals of the carboxylic acid and the trichloromethylated compound are the same, e.g., phenyl, the reaction products with various hydrocarbon reactants may be, for example:

| Aromatic Compound Acylated | Chief Reaction Products |
| --- | --- |
| Naphthalene | α- and β-benzoylnaphthalene. |
| Toluene | 4-methylbenzophenone. |
| p-Xylene | 2,5-dimethylbenzophenone. |
| o-Xylene | 3,4-dimethylbenzophenone. |
| Pseudocumene | 2,4,5-trimethylbenzophenone. |
| Mesitylene | 2,4,6-trimethylbenzophenone. |
| Ethylbenzene | 4-ethylbenzophenone. |
| Dodecylbenzene | 4-dodecylbenzophenone. |
| α-Methylnaphthalene | 1-(4-methylnaphthyl) phenyl ketone. |
| Anisole | p-methoxybenzophenone. |
| 2,4-Xylyl methyl ether | 3-methoxy-2,4-dimethylbenzophenone. |
| Ethyl phenyl sulfide | 4-ethylmercaptobenzophenone. |
| 2-Ethylthiophene | 2-(5-ethylthienyl) phenyl ketone. |
| Chlorobenzene | p-chlorobenzophenone. |
| o-Chlorotoluene | 3-chloro-4-methylbenzophenone. |
| Phenyl salicylate | phenyl 5-benzoylsalicylate. |
| α-Benzoylnaphthalene | 1,5-dibenzoylnaphthalene. |
| p-Nitrophenyl phenyl ether | 4-(p-nitrophenoxy)benzophenone. |
| Acetanilide | 4-acetaminobenzophenone. |

With m-toluic acid as the carboxylic reactant and benzotrichloride as the trichloromethyl compound, typical aromatic reactants and products are illustrated by the following list:

| Aromatic Compound Acylated | Chief Reaction Products |
| --- | --- |
| Naphthalene | α- and β-naphthyl m-tolyl ketone and α- and β-benzoylnaphthalene. |
| o-Xylene | 3,3',4-trimethylbenzophenone and 3,4-dimethylbenzophenone. |
| Biphenyl | 3-methyl-4'-phenylbenzophenone and 4-phenylbenzophenone. |
| Cumene | 4-isopropyl-3'-methylbenzophenone and 4-isopropylbenzophenone. |
| Durene | 1,2,3',4,5-pentamethylbenzophenone and 1,2,4,5-tetramethylbenzophenone. |
| Phenetole | 4-ethoxy-3-methylbenzophenone and 4-ethoxybenzophenone. |
| Thiophene | 2-thienyl m-tolyl ketone and 2-thienyl phenyl ketone. |
| 2-Chloro-p-xylene | 4-chloro-2,3',5-trimethylbenzophenone and 4-chloro-2,5-dimethylbenzophenone. |
| 4-Phenylacetophenone | 4-(4-acetylphenyl)-3'-methylbenzophenone and 4-(4-acetylphenyl)-benzophenone. |
| 4-Nitroperylene | 4-nitro-10-m-tolyuylperylene and 4-nitro-10-benzoylperylene. |

Similarly, by reaction of o- and p-toluic acids with benzotrichloride and various aromatic compounds capable of acylation, there may be obtained 4,4'-dimethylbenzophenone, 2,4' - dimethylbenzophenone, 2,3',4' - trimethylbenzophenone, 3,4,4'-trimethylbenzophenone, 4-ethyl-4' - methylbenzophenone, 2,3,4,6-tetramethylbenzophenone, 2,3,4',5,6 - pentamethylbenzophenone, 3,4 - diethyl-4'-methylbenzophenone, 4-dodecyl-4'-methylbenzophenone, 4-t-butyl-2'-methylbenzophenone, 1-(4-amyl-naphthyl)-4-tolyl ketone, 4'-benzylbiphenylyl 2-tolyl ketone, 1-(2-isobutoxynaphthyl) p-tolyl ketone, 2,4-dibromobenzophenone, 2,4 - dibromo - 2 - methylbenzophenone, 2,7-dibenzoylfluorene, 2-benzoyl-7-p-toluylfluorene, 4 - acetamino - 2 - chloro - 4' - methylbenzophenone, 2,5 - dimethoxy - 4' - methylbenzophenone, 7 - bromo - 12 - o - toluylbenz[α]anthracene, etc.

Other carboxylic acids with benzotrichloride and various aromatic hydrocarbons or substituted hydrocarbons capable of acylation, when reacted in accordance with the present process, may give, for example, di - α - naphthyl ketone, 2,3',4,4' - tetramethylbenzophenone, 2,4',5 - tri - methylbenzophenone, 2,2',5,5' - tetramethylbenzophenone, 2,4 - dimethyl - 4' - phenylbenzophenone, 4,4' - diethylbenzophenone, 4 - chlorophenyl α - naphthyl ketone, 4 - chloro - 4' - methoxybenzophenone, ethyl p - 2,5-xyloylbenzoate, 4 - isopropyl - 3' - nitrobenzophenone, 3 - hydroxy - 2 - naphthyl phenyl ketone, 4,4' - dichloro - 3 - methylbenzophenone, p - ethoxyphenyl 1,4 - dichloro - 5 - naphthyl ketone, 2-chloro-4-methyl-4'-nitrobenzophenone, 3 - bromo - 2' - hydroxy-6-isopropylbenzophenone, 3 - nitrophenyl 2 - thienyl ketone, 2 - acetyl - 1 - naphthyl 4 - isopropoxy - 1 - naphthyl ketone, ethyl o - methoxy - p - (m - nitrobenzoyl) benzoate, 4 - acetamino - 4' - methoxybenzophenone, etc.

Improved yields of desired single isomers are obtained by taking similarly substituted aromatic radicals in the aryltrichloromethane and in the aromatic carboxylic acid used in the reaction mixtures; for examples, from 2,4-dichlorobenzotrichloride, 2,4-dichlorobenzoic acid and toluene, there may be obtained 2,4-dichloro-4'-methylbenzophenone; from 2-trichloromethylanisole, the methyl ether of salicyclic acid, and phenetole, there may be produced 4-ethoxy-2'-methoxybenzophenone; from m-nitrobenzotrichloride, m-nitrobenzoic acid, and nitromesitylene, there may be formed 2,4,6-trimethyl-3,3'-dinitrobenzophenone, etc.

When a bis(trichloromethyl) compound such as α,α,α',α',α'-hexachloro-p-xylene is used in the synthesis disclosed by the present invention, it is evident that the products may contain diketone compounds. For example, by reaction of α,α,α,α',α',α'-hexachloro-p-xylene, benzoic acid and p-xylene, there may be prepared bis(2,5-dimethylbenzoyl)benzene, in addition to 2,5-dimethylbenzophenone.

The invention is carried out by mixing the aromatic carboxylic acid, the aryltrichloromethane, and the aromatic compound capable of acylation, generally in the molar ratio of about 1:1:2, respectively, with the reaction catalyst. The molar ratios of the three aromatic reactants may vary widely, the molar ratio of acid to trichloromethane varying, for example, from about 1:5 to 5:1. Usually it is preferable, however, to remain in the range of from 1 equivalent of acid to about 1.5 equivalent of trichloride, to 1 equivalent of acid to about 1.0 equivalent of trichloride, to avoid the presence of excessive amounts of unreacted ingredients when reaction is completed. Maximum yields may be obtained at about 1 part acid to 1.05 parts trichloride. The aromatic compound capable of acylation, which may act as a solvent medium for the reaction, may be present in greater excess, if desired, such as from 2 to 10 or up to 20 parts per combined single part of acid plus trichloride. If desired, other solvents or diluents, e.g., hydrocarbons such as petroleum distillates boiling in the range of 100 to 200° C., may be present in the reaction mixture. The catalyst, e.g., metal halide or oxide, etc., utilized in the reaction need be present only in low amounts, such as from 0.01 percent by weight of total reactants or less, up to 10 percent or more.

The mixture, consisting of the three reactants and the catalyst, is heated to accelerate the reaction. Conveniently, it may be heated to the reflux temperature of the mixture. The process may be operated at ordinary atmospheric pressure, or, if desired, sub- or super-atmospheric pressures may be applied, e.g., to alter the reaction temperature. In general, the reactivity of the aromatic hydrocarbons in the present process varies with the degree of alkylation, the xylenes, for example, being more active than toluene. Accordingly, the temperature to which the reaction mixture is heated will be varied with the type of compound undergoing reaction. Generally, lower temperatures require longer time of reaction. The optimum reaction temperature and time may usually be most easily determined by observation of the evolution of hydrogen chloride during the reaction. Appearance of the hydrogen chloride may be first observed, for example, when the mixture reaches a temperature of, e.g., 70–120° C. As the vigor of reaction moderates, and the extent of hydrogen chloride evolution slackens, the temperature may be raised gradually, e.g., up to about 150–200° C. During the reaction, the hydrogen chloride evolved is preferably removed from the reaction zone, e.g., by venting to an absorbing flask, sweeping out the reactor with an inert gas, etc. When substantially no further gaseous products may be observed to be formed in the reaction mixture, heating may be discontinued, and the product or products may be separated, by distillation, extraction or other means. Unreacted acid, aryltrichloromethane and unacylated reactive aromatic compounds may be recycled for further reaction, and the process may be operated as a batch or as a continuous method.

The invention is further illustrated, but not limited, by the following examples:

EXAMPLE 1

*o-Xylyl phenyl ketone—isolation by distillation*

A mixture of 61.0 grams (0.5 mole) of benzoic acid, 102.8 grams (0.525 mole) of benzotrichloride, and 212.3 grams (2 moles) of o-xylene was placed in a 1-liter flask with 5 grams of freshly fused zinc chloride. Reaction began (vigorous evolution of hydrogen chloride) as the temperature of the mixture was raised to 120° C. After half an hour at this temperature, the mixture was gradually brought up to 150–165° C. during the next hour; HCl evolution decreased, and after a further ¾ hour's heating at about 165° C., the dark-colored reaction product was let cool, and was transferred to a 500 ml. flask. On distillation through a ten-inch Vigreux column using a capillary ebullator, after removal of unreacted xylene and benzoic acid, there were obtained 186.2 grams of pale yellow 3,4-dimethylbenzophenone, b. 135–145° C./0.2 mm., a yield of 88.7%.

EXAMPLE 2

*o-Xylyl phenyl ketone–isolation by washing*

A charge of 61.0 grams of benzoic acid, 102.8 grams of benzotrichloride, 212.3 grams of 90 percent o-xylene, and 5 grams of freshly fused zinc chloride was heated at 120–165° C. for 3 hours, as above. In this experiment, the reaction product was worked up by washing with water before the unreacted xylene was removed by distillation. After cooling, the reaction mass, which weighted 326 grams, was divided into several portions. An 85 gram portion of this was washed twice with 200 ml. portions of water at 80° C. for 10 minutes, and the xylene was then removed from the organic layer by distillation, leaving 54 grams (99.5 percent yield) of 3,4-dimethylbenzophenone. Another portion was washed with 200 ml. of warm water, and then stirred with 100 grams of 20 percent sodium carbonate for ½ hour, decanted, and washed once again with warm water. After the xylene had been stripped off, 51.5 grams of ketone were obtained, which equals a 100 percent yield calculated on the 80 grams of reaction product treated. Analysis of these two portions gave the following results:

|  | Portion 1 | Portion 2 |
|---|---|---|
| Acidity, me./g. | 0.11 | 0.00 |
| Hydrolyzable Chlorine | none | none |
| Ionic Chlorine | none | none |

The above data illustrate the excellent yields of highly pure ketone which may be obtained very simply and directly by the present process.

EXAMPLE 3

*o-Xylyl phenyl ketone—using oxidation benzoic acid*

In this run, a slurry of benzoic acid in toluene, as obtained in the synthesis of benzoic acid by oxidation of toluene, was used as the aromatic acid of the reaction mixture. By distillation, 136.1 grams of toluene, b. 54–63° C./160 mm., were removed from a 232 gram portion of a toluene-benzoic acid slurry containing 26.3 percent benzoic acid, according to earlier analysis. To the remaining benzoic acid in toluene, there were added 102.8 grams (0.525 mole) of benzotrichloride, 212.3 grams (2 moles) of o-xylene, and 5 grams of zinc chloride. The temperature of the mixture was gradually raised from 110° C. up to about 160° C. over a period of 2 hours. Then the reaction product was distilled; after removal of unreacted materials, there were collected 176.7 grams of 3,4-dimethylbenzophenone, b. 132–152° C. at 0.28 mm., $n_D^{25}$ 1.5952, an 85.7 percent yield.

EXAMPLE 4

*o-Xylyl phenyl ketone—ZnO catalyst*

A mixture of 61 grams (0.5 mole) of benzoic acid, 107.5 grams (0.55 mole) of benzotrichloride, 212 grams (2 moles) of 90 percent o-xylene, and 1 gram of zinc oxide was heated at 110–165° C. for about 5½ hours. On fractionation of the reaction product, 111 grams of unreacted o-xylene were recovered, and there were obtained 180 grams of 3,4-dimethylbenzophenone, b. 132–145° C./0.7 mm., $n_D^{25}$ 1.5957.

EXAMPLE 5

*o-Xylyl phenyl ketone—Zn dust catalyst*

A charge of 61 grams of benzoic acid, 107.5 grams of benzotrichloride, 212 grams of 90 percent o-xylene and 2.5 grams of zinc dust was refluxed while HCl was removed; the temperature of the mixture rising from 94° C. to 168° C. over a period of 4¼ hours. There were obtained on distillation 182 grams, an 86.8 percent yield, of the 3,4-dimethylbenzophenone, b. 132–138° C./0.5 mm.

EXAMPLE 6

*o-Xylyl phenyl ketone—Zn benzoate catalyst*

Zinc benzoate was prepared by refluxing a mixture of 200 ml. of water, 12.5 grams of zinc carbonate and 24.4 grams of benzoic acid for an hour and a half; the zinc salt was isolated by filtration and dried.

A charge consisting of 61 grams of benzoic acid, 107.5 grams of benzotrichloride, 212 grams of 90 percent o-xylene and 5 grams of zinc benzoate was heated at 90–170° C. for about 4 hours; then the reaction mixture was cooled and subjected to fractional distillation. A 90.7 percent yield (190.5 grams) of 3,4-dimethylbenzophenone, b. 138° C./1.0 mm.–126° C./0.3 mm., was obtained.

EXAMPLE 7

*o-Xylyl phenyl ketone—FeCl₃ catalyst*

A mixture of 61 grams of benzoic acid, 102.7 grams of benzotrichloride, 212 grams of 90 percent o-xylene, and 3 grams of ferric chloride was charged to a flask and heated. Evolution of HCl became rapid at above 50° C.; the temperature of the mixture was raised up to 160° C., during the course of the next two hours, after which evolution of hydrogen chloride had ceased and heating was stopped. On fractionation, after removal of unreacted ingredients, the 3,4-dimethylbenzophenone was recovered as the portion boiling from 135° C. to 142° C./0.7 mm., $n_D^{27}$ 1.5960, which weighed 179 grams.

EXAMPLE 8

*o-Xylyl phenyl ketone—TiCl₄ catalyst*

Refluxing 61 grams of benzoic acid, 107.5 grams of benzotrichloride, and 212 grams of 90 percent o-xylene with 10 grams of titanium tetrachloride for 14 hours yielded 86 grams of 3,4-dimethylbenzophenone, b. 135° C./0.5 mm.–150° C./1.2 mm.

EXAMPLE 9

*o-Xylyl phenyl ketone—SbCl₃ catalyst*

Refluxing 61 grams of benzoic acid, 107.5 grams of benzotrichloride, and 212 grams of 90 percent o-xylene with 5 grams of antimony trichloride for 22½ hours gave 55.5 grams of 3,4-dimethylbenzophenone, b. 135–141° C./0.5 mm.

EXAMPLE 10

*Ethylbenzophenone*

A mixture consisting of 61 grams of benzoic acid, 107.5 grams of benzotrichloride, 212 grams of ethylbenzene, and 2 grams of zinc oxide was placed in a flask and heated. Evolution of hydrogen chloride became vigorous at 93° C.; the temperature was raised to about 160° C. while hydrogen chloride was evolved, for about 10 hours. After removal of 106 grams of unreacted ethylbenzene and some six grams of other material, there were obtained 161 grams of p-ethylbenzophenone (a 76.8 percent yield), b. 138–142° C./1.2–1.0 mm., $n_D^{24}$ 1.5888.

EXAMPLE 11

*Phenylbenzophenone*

To a flask were added 308 grams (2 moles) of biphenyl, 61 grams of benzoic acid, 102.7 grams of benzotrichloride, 5 grams of zinc benzoate and, as solvent, 25 ml. of dichlorobenzene. The mixture was heated at 100–175° C. for about 5 hours, and then distilled, yielding 184 grams of p-phenylbenzophenone as a fraction which substantially all boiled at 180–185° C./0.5 mm., melted at 95–97° C., and gave an elemental analysis as follows:

|  | Found | Calculated for $C_{19}H_{14}O$ |
|---|---|---|
| Percent C | 88.27 | 88.3 |
| Percent H | 5.73 | 5.42 |

While the foregoing description and exemplary operations have served to illustrate specific applications and results, the invention is not limited thereto. Other obvious modifications will readily occur to those skilled in the art.

What is claimed is:

1. The process which comprises heating to reaction temperatures a mixture of an aromatic carboxylic acid, an aryltrichloromethane, and an aromatic compound capable of acylation, in the presence of an acylation catalyst, continuing said heating until substantial cessation of evolution of hydrogen chloride occurs, and isolating from the resulting reaction product a diaryl ketone.

2. The process which comprises heating to reaction temperature a mixture of an aromatic carboxylic acid, an aryltrichloromethane, and an aromatic compound capable of acylation, in the presence of zinc chloride, continuing said heating until substantial cessation of evolution of hydrogen chloride occurs, and isolating from the resulting reaction product a diaryl ketone.

3. The process which comprises heating to reaction temperature a mixture of an aromatic carboxylic acid, an aryltrichloromethane, and an aromatic compound capable of acylation, in the presence of catalytic amount of finely divided zinc, continuing said heating until substantial cessation of evolution of hydrogen chloride occurs, and isolating from the resulting reaction product a diaryl ketone.

4. The process which comprises heating to a temperature of from 50–250° C. in the presence of ferric chloride, a mixture comprising an aromatic carboxylic acid, an aryltrichloromethane and an aromatic compound capable of acylation, continuing said heating until substantial cessation of evolution of hydrogen chloride occurs, and isolating from the resulting reaction product a diaryl ketone.

5. The process which comprises heating to a temperature of about 125–175° C. a mixture consisting of benzoic acid, benzotrichloride, and ethylbenzene, in the presence of zinc oxide, continuing said heating until evolution of hydrogen chloride is substantially complete, and isolating from the resulting reaction product 4-ethylbenzophenone.

6. The process which comprises heating to a temperature of about 125–175° C. a mixture consisting of benzoic acid, benzotrichloride, and biphenyl, in the presence of zinc benzoate, continuing said heating until evolution of hydrogen chloride is substantially complete, and isolating from the resulting reaction product 4-phenylbenzophenone.

7. The process which comprises heating to a temperature of from 50 to 250° C. in the presence of zinc oxide as catalyst, a mixture comprising benzoic acid, benzotrichloride, and an aromatic compound capable of acylation, continuing said heating until substantial cessation of evolution of hydrogen chloride occurs, and isolating from the resulting reaction product a diaryl ketone.

8. The process which comprises heating to a temperature of from 140–175° C. a mixture comprising benzoic acid, benzotrichloride, and o-xylene in the presence of catalytic amounts of zinc chloride, continuing said heating until substantial cessation of evolution of hydrogen chloride has occurred, and isolating from the resulting reaction product 3,4-dimethylbenzophenone.

9. The process which comprises heating to a temperature of from 140–175° C. a mixture comprising benzoic acid, benzotrichloride, and o-xylene, in the presence of a catalytic amount of finely divided zinc, continuing said heating until substantial cessation of evolution of hydrogen chloride has occurred, and isolating from the resulting reaction product 3,4-dimethylbenzylphenone.

References Cited in the file of this patent

UNITED STATES PATENTS

| | | |
|---|---|---|
| 1,966,797 | Groggins et al. | July 17, 1934 |
| 2,386,007 | Schmerling et al. | Oct. 2, 1945 |

FOREIGN PATENTS

| | | |
|---|---|---|
| 2,878 | Great Britain | 1880 |
| 293,924 | Great Britain | July 19, 1928 |
| 876,690 | Germany | May 18, 1953 |

OTHER REFERENCES

Whitmore: Organic Chemistry, 2nd ed., p. 693 (1951).